United States Patent
Fine et al.

(10) Patent No.: US 7,499,572 B2
(45) Date of Patent: Mar. 3, 2009

(54) SURFACE SEGMENTATION FROM LUMINANCE AND COLOR DIFFERENCES

(75) Inventors: Ione Fine, Del Mar, CA (US); Geoffrey M. Boynton, Del Mar, CA (US)

(73) Assignee: The Salk Institute for Biological Studies, La Jolla, CA (US)

(*) Notice: Subject to any disclaimer, the term of this patent is extended or adjusted under 35 U.S.C. 154(b) by 1131 days.

(21) Appl. No.: 10/881,966

(22) Filed: Jun. 29, 2004

(65) Prior Publication Data

US 2005/0058351 A1   Mar. 17, 2005

Related U.S. Application Data

(60) Provisional application No. 60/484,155, filed on Jun. 30, 2003.

(51) Int. Cl.
*G06K 9/00* (2006.01)
*G09G 5/00* (2006.01)

(52) U.S. Cl. .................. 382/106; 382/164; 345/604

(58) Field of Classification Search .............. 382/103, 382/106, 107, 128, 162, 164, 165, 168, 173, 382/175, 181, 188, 194, 209, 224, 232, 254, 382/274, 276, 286–298, 312; 345/419, 591, 345/604, 612; 342/357.13; 434/262
See application file for complete search history.

(56) References Cited

U.S. PATENT DOCUMENTS

| | | | | |
|---|---|---|---|---|
| 5,016,173 A | * | 5/1991 | Kenet et al. | 382/128 |
| 6,331,116 B1 | * | 12/2001 | Kaufman et al. | 434/262 |
| 6,750,815 B2 | * | 6/2004 | Michaelson et al. | 342/357.13 |
| 7,148,887 B2 | * | 12/2006 | Kaufman et al. | 345/419 |
| 7,194,117 B2 | * | 3/2007 | Kaufman et al. | 382/128 |

OTHER PUBLICATIONS

Fine, Ione et al. (2002) "Surface segmentation based on the luminance and color statistics of natural scenes," Optical Society of America Fall Vision Meeting, Oct. 24-27, 2002, San Francisco, California, FVM Abstract Book, p. 19.*

I Fine, Ione et al. (Jul. 2003) "Surface segmentation based on the luminance and color statistics of natural scenes," J. Opt. Soc. Am. A., 20(7): 1283-1291.*

(Continued)

*Primary Examiner*—Seyed Azarian
(74) *Attorney, Agent, or Firm*—Morrison & Foerster LLP (57) ABSTRACT

A method for determining if a first pixel and a second pixel belong to a same surface includes: determining a spatial-difference value for the first pixel and the second pixel; determining one or more vision-difference values for the first pixel and the second pixel; determining, from the spatial-difference value, an initial same-surface probability value for if the first pixel and the second pixel belong to the same surface; determining, from the one or more vision-difference values, a first vision-difference probability value for if the first pixel and the second pixel belong to the same surface; determining, from the spatial-difference value and the one or more vision-difference values, a second vision-difference probability value; determining, from the initial same-surface probability value, the first vision-difference probability value and the second vision-difference probability value, an improved same-surface probability value for if the first pixel and the second pixel belong to the same surface.

28 Claims, 9 Drawing Sheets

OTHER PUBLICATIONS

Ruderman, Daniel L. et al. (Aug. 1998) "Statistics of cone responses I to natural images: implications for visual coding," J. Opt. Soc. Am. A., I 15(8): 2036-2045.*

Fine, Ione et al. (Jul. 2003) "Surface segmentation based on the luminance and color statistics of natural scenes," J. Opt. Soc. Am. A., 20(7): 1283-1291.

Ruderman, Daniel L. (1994) "The statistics of natural images," Network: Computation in Neural Systems, 5: 517-548.

Ruderman, Daniel L. et al. (Aug. 1998) "Statistics of cone responses to natural images: implications for visual coding," J. Opt. Soc. Am. A., 15(8): 2036-2045.

* cited by examiner

$\delta_\ell = \ell_1 - \ell_2 \quad \delta_{rg} = rg_1 - rg_2 \quad \delta_{by} = by_1 - by_2$

FIG._5A image patch  *FIG._5B* observer  *FIG._5C* model  *FIG._5D*

*FIG._5E*

FIG._6A image patch FIG._6B observer FIG._6C model FIG._6D

SURFACE SEGMENTATION FROM LUMINANCE AND COLOR DIFFERENCES

CROSS-REFERENCE TO RELATED APPLICATIONS

This application claims the benefit of provisional application 60/484,155, filed Jun. 30, 2003, and incorporated herein in its entirety by reference.

BACKGROUND OF THE INVENTION

1. Field of Invention

The present invention relates to visions systems and related data processing.

2. Description of Related Art

Segmentation of images for vision data has become increasingly important for interpretation of scenes, particularly where specific surfaces (or classes of surfaces) are targets in an application. In this context, various roles for color vision have been proposed, including finding or discriminating edible fruits and leaves, facilitating scene and object recognition, and improving search under certain conditions. Additional applications include automatic segmenting of different types of tissue in medical images and automatic segmenting of targets in satellite photos. There has also been increasing interest within computer science in using color as a means of segmenting and identifying "meaningful regions" within a scene.

However, conventional approaches related to correlation methods and independent components analysis have been applied to these problems with limited success. Additionally, methods based on probability distributions (e.g., Bayesian analysis) are often based on assumptions for the underlying distributions that are not fully justified either in terms of the underlying data or in terms of matching the assumptions made by biological systems.

Thus, there is need for improved methods for segmentation of images, where vision-related information can be incorporated with limited modeling assumptions.

SUMMARY OF THE INVENTION

In one embodiment of the present invention, a method for determining if a first pixel and a second pixel belong to a same surface includes: determining a spatial-difference value for the first pixel and the second pixel; determining one or more vision-difference values for the first pixel and the second pixel; determining, from the spatial-difference value, an initial same-surface probability value for if the first pixel and the second pixel belong to the same surface; determining, from the one or more vision-difference values, a first vision-difference probability value for if the first pixel and the second pixel belong to the same surface; determining, from the spatial-difference value and the one or more vision-difference values, a second vision-difference probability value; determining, from the initial same-surface probability value, the first vision-difference probability value and the second vision-difference probability value, an improved same-surface probability value for if the first pixel and the second pixel belong to the same surface.

In this way the present invention enables the use of vision data to achieve improved results for surface segmentation of images.

DETAILED DESCRIPTION OF EXEMPLARY EMBODIMENTS

Determining if Two Pixels Belong to the Same Surface

Figure 1:
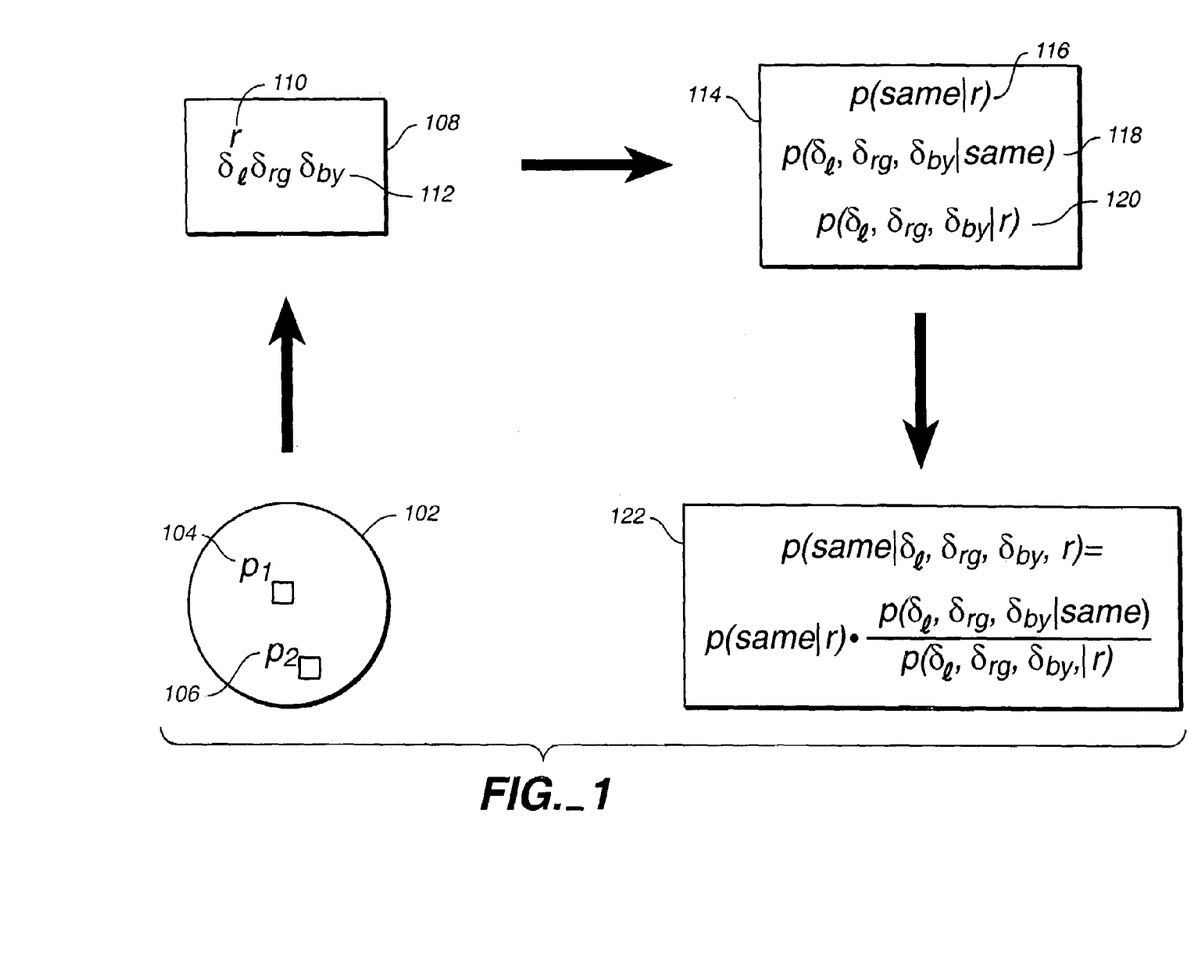
FIG. 1 shows an embodiment of the present invention.

An embodiment of the present invention is shown in FIG. 1. A vision field 102 (e.g., from a CCD (Charge-Coupled Device) display) includes a first pixel $P_1$ 104 and a second pixel $P_2$ 106.

Pixel difference information 108 corresponding to the pixels 104, 106 includes a spatial-separation measure r 110 that measures the spatial separation (or distance) between the pixels 104, 106 (e.g., measured in degrees of vision angle or in Euclidian distance). Additional pixel difference information 108 includes vision-difference information 112 that is also measured as a difference between values at the two pixels 104, 106. For the embodiment shown in FIG. 1, the vision-difference information 112 includes three vision characteristics: $\delta_l$ a luminance difference, $\delta_{rg}$, a red-green difference, and $\delta_{by}$, a blue-yellow difference (e.g., measured in the MacLeod Boynton chromaticity space).

The pixel difference information 108 is then used for evaluating a set of vision probability functions 114, the determination of which is discussed below. For the embodiment shown in FIG. 1, the vision probability functions include three functions. The probability function p(same|r) 116 measures the probability that two pixels belong to the same surface as a function of the pixel separation r. The probability function $p(\delta_l, \delta_{rg}, \delta_{by}|same)$ 118 measures the probability density of the vision difference information 112 if the two pixels belong to the same surface. The probability function $p(\delta_l, \delta_{rg}, \delta_{by}|r)$ 120 measures the probability density of the vision difference information 112 as a function of the pixel separation r.

Next the evaluated vision probability functions 114 are arithmetically combined 122 to form a segmentation function $p(same|\delta_l, \delta_{rg}, \delta_{by}, r)$ according to the formula $$p(\text{same} \mid \delta_1, \delta_{rg}, \delta_{by}) = p(\text{same}|r) \cdot \frac{p(\delta_1, \delta_{rg}, \delta_{by} \mid \text{same})}{p(\delta_1, \delta_{rg}, \delta_{by} \mid r)}. \quad (1)$$

The above formula provides a simple way to determine if two pixels belong to the same surface and correspondingly enables image segmentation for a vision field 102 with many pixels, for example, by making pair-wise comparisons among the pixels. The above formula can be derived under the assumption that that the probability density for the vision difference information corresponding to two pixels on the same surface is independent of the pixel separation:

$$p(\delta_l, \delta_{rg}, \delta_{by}|same) = p(\delta_l, \delta_{rg}, \delta_{by}|same, r). \quad (2)$$

Determining Pixel Difference Information

Pixel difference information 108 can be obtained by available hardware. A set of twelve images of natural scenes were used for demonstration and testing. These twelve images have also been used by others in vision analysis. (D. L. Ruderman, "The Statistics of Natural Images", Network 6, 345-358 (1994).)

The images were taken with an Electrim EDC-100TE camera. Light reaching the imaging CCD (Charge-Coupled Device) display was passed through a variable interference filter with a wavelength ($\lambda$) range of 400-740 nm and a half-bandwidth that was typically 15 nm at each wavelength. To create each image, 43 successive data frames were taken at 7-8-nm intervals from 403-719 nm. Images were collected from a variety of natural environments such as temperate woodland, subtropical rain forest, and mangrove swamp. In the corner of each scene (in a region of the image excluded from our data set) was placed a pair of small rectangular white and black reflectance standards with known reflectance functions. Spectralon 100% diffuse reflectance material (Labsphere) was used as the white standard and a nominally 3% spectrally flat diffuse reflector (MacBeth) was used as the black standard. Each of the data frames was then calibrated by using the values of the small black and white standards within the frame. When this procedure resulted in negative intensity values, the minimum uncalibrated pixel within the data frame was used in place of the dark standard. No attempt was made to correct for local variations in illumination. It should be noted that this data set contained very few deep shadows.

The three cone responses to each pixel were derived by using $\Sigma_\lambda Q(\lambda) R(\lambda) I(\lambda)$, where $Q(\lambda)$ is the Stockman-MacLeod-Johnson spectral sensitivity of the given cone type, $R(\lambda)$ is the measured spectral reflectance and $I(\lambda)$ is the standard illuminant D65 (meant to mimic a daylight spectrum); the sum is over the wavelengths represented in the spectral data. Each pixel in the image was therefore represented by three numbers representing the excitations of each of the three human cones at that pixel's position in space. The data were then transformed into Ruderman-Cronin-Chiao co-ordinates by converting each cone output into a logarithmic signal (base 10) and subtracting the logarithmic mean. These logarithmic outputs (L, M, and S) were then transformed:

$$l = \frac{1}{\sqrt{3}}(L + M + S) \quad (3)$$

$$rg = \frac{1}{\sqrt{2}}(L - M)$$

$$by = \frac{1}{\sqrt{6}}(L + M - 2S).$$

Figure 2A:
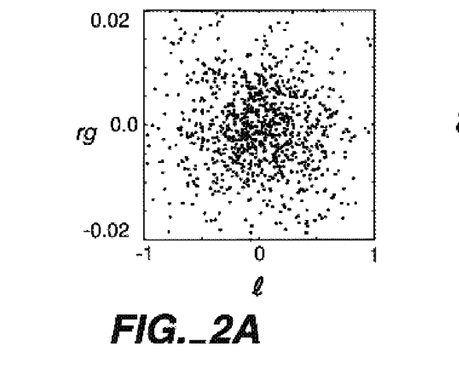
FIG. 2A shows a scatter plot of l versus rg in an application of the embodiment shown in FIG. 1.

The resulting axes are similar to the three orthogonal principal axes obtained by principal components analysis on this signal, and are similar to the luminance, red-green and blue-yellow opponent mechanisms that have been characterized psychophysically and physiologically. Correlations among these three measures are very small. For the scenes being studied, the correlation coefficient between luminance (l) and red green (rg) values was −0.0845, between luminance and blue yellow (by) values was −0.0391, and between red-green and blue-yellow values was 0.0947. A scatter plot of a thousand randomly chosen pixels projected onto the luminance and red-green axes is shown in FIG. 2A.

Though other transformations can convert cone signals into relatively de-correlated opponent axes, one advantage of the Ruderman-Cronin-Chiao coordinates is that the (biologically plausible) logarithmic transformation of the data points distributes points along the axes relatively uniformly. Without the logarithmic transformation, data tend to be clustered near the zeros of the axes. Besides their compatibility with psychophysical and physiological data, these properties of de-correlation and even distribution of data points along the axes give some assurance that the statistical properties described herein are not due to first-order correlations between the luminance and color of individual pixels or to the luminance and color of individual pixels being clustered near gray. Alternative choices for the coordinate axes are also possible.

Figure 2B:
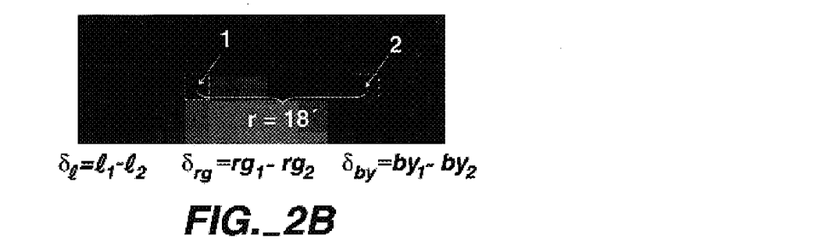
FIG. 2B shows a small patch from a natural image in an application of the embodiment shown in FIG. 1.

Each of the twelve images was 128×128 pixels, with each pixel roughly representing 3×3 min of visual angle. Each picture therefore represented approximately 6.4×6.4 deg of visual angle. As illustrated in FIG. 2B, pixels were randomly sampled from all of the 12 images. For each pair of sampled pixels the difference along luminance ($\delta_l$), red-green ($\delta_{rg}$), and blue-yellow ($\delta_{by}$) axes was computed. The radius of separation (r) between the pair of pixels varied between ~3 and ~150 min of visual angle. Twenty-four thousand randomly chosen pairs of pixels were sampled for each radius separation, by sampling evenly from each of the 12 images. The distribution of ($\delta_{rg}$) was found to be much tighter than for ($\delta_l$), or ($\delta_{rg}$). To allow comparison of the shapes of the distributions, the sampled values of ($\delta_l$), ($\delta_{rg}$), ($\delta_{by}$) were independently scaled so that 90% of the samples lay between −1 and 1.

Figure 2C:
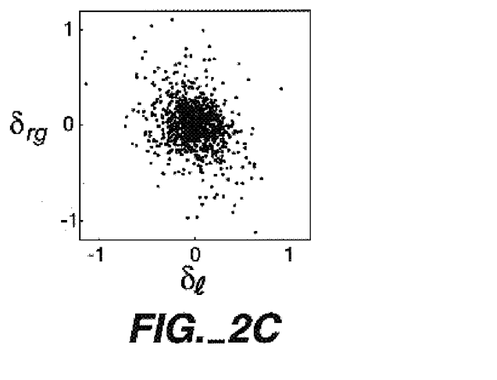
FIG. 2C shows a scatter plot of $\delta_l$ versus $\delta_{rg}$ in an application of the embodiment shown in FIG. 1.

Although, as described above, correlations among luminance, red-green and blue-yellow axes are relatively small, differences between pairs of pixels for these directions in color space do not show the same independence. This interdependence does not, however, take the form of a linear correlation between the differences. FIG. 2C shows a scatter plot of differences along luminance and red-green axes for 1000 randomly chosen pairs of pixels separated by 18 min, showing that differences along these two axes are relatively uncorrelated.

Even though differences in luminance between two pixels are associated with differences in color, the sign and the magnitude of these changes are relatively uncorrelated. As a result, correlation coefficients between differences in luminance and color across pixels, though significant, are not large. For example, the correlation coefficients between color differences for pixels separated by 18 min were −0.1922 between luminance and red-green axes, −0.0737 between luminance and blue-yellow axes, and 0.1783 between red-green and blue-yellow axes. Correlation coefficients between absolute values of luminance and color differences were only slightly larger: 0.2358, 0.2243 and 0.1733, respectively.

In contrast, examining the empirically sampled joint density function for luminance and color differences demonstrates a noticeable failure of independence. For pixel separations between 3 and 150 min the joint probability density function (pdf), $p(\delta_l, \delta_{rg}, \delta_{by})$ for luminance and color differences between pairs of pixels was estimated (through sampling). The joint pdf for each radius of pixel separation can be thought of as a three-dimensional cube with axes $\delta_l$, $\delta_{rg}$, and $\delta_{by}$, filled with the probability values for those particular values of $\delta_l$, $\delta_{rg}$, and $\delta_{by}$.

Figures 2D, 2E:
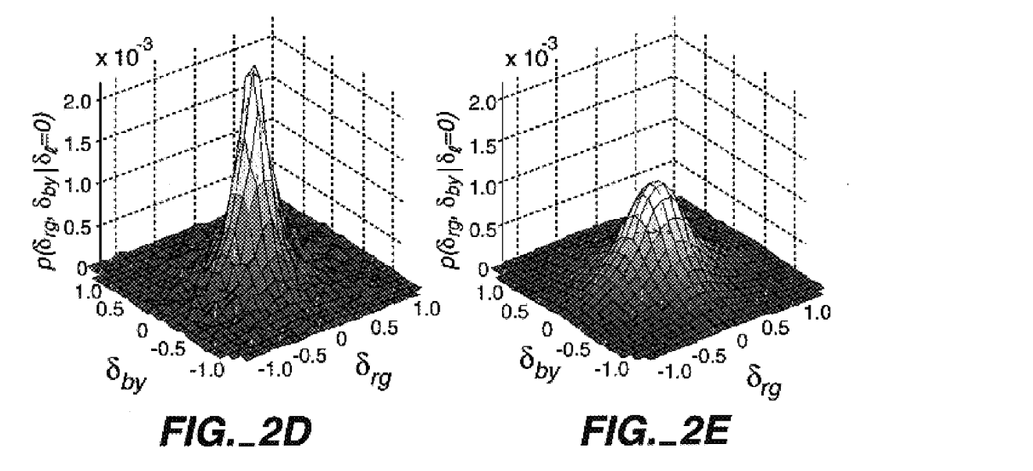
FIG. 2D shows a joint pdf of differences along the red-green and blue-yellow axes for pixels separated by 18 min. in an application of the embodiment shown in FIG. 1.
FIG. 2E shows a joint pdf of differences along red-green and blue-yellow axes for pixels separated by 18 min. assuming independence in an application of the embodiment shown in FIG. 1.

FIG. 2D shows a slice through this cube in the plane $\delta_l=0$ for a pixel separation of 18 min. As expected, the joint pdf is peaked at 0 along both $\delta_{rg}$, and $\delta_{by}$ axes; small differences along the red-green axis are associated with small differences along the blue-yellow axis. Slices through the cube in the planes $\delta_l=0$ and $\delta_{by}=0$ look very similar. FIG. 2E shows how the $\delta_l=0$ slice would look if $\delta_l$, $\delta_{rg}$, and $\delta_{by}$ were independent, calculated by using their marginal probabilities, i.e., assuming that $p(\delta_l, \delta_{rg},$ and $\delta_{by})=p(\delta_l)\cdot p(\delta_{rg})\cdot p(\delta_{by})$. The joint density functions obtained assuming independence are far less peaked near zero than the real joint pdf of FIG. 2D. This deviation from independence of differences in luminance and color across pixels is captured by the mutual information between (for instance) $\delta_l$, and $\delta_{rg}$, $I(\delta_l; \delta_{rg})$. This is the expected value of the binary logarithm of the ratio $p(\delta_l, \delta_{rg})/p(\delta_l)\cdot p(\delta_{rg})$, or, equivalently, Kullback-Leibler divergence between the joint density and the product of the marginal densities. For a pixel separation of 18 arc min the mutual information between $\delta_l$ and $\delta_{rg}$ was $I(\delta_l; \delta_{rg})=0.154$; likewise, $I(\delta_l; \delta_{by})=0.138$, and $I(\delta_l; \delta_{by})=0.131$. The mutual information between luminance and color was not strongly effected by pixel separation: For a pixel separation of 3 min, $I(\delta_l; \delta_{rg})=0.182$; likewise, $I(\delta_{rg}; \delta_{by})=0.085$, and $I(\delta_l, \delta_{by})=0.151$, and for a pixel separation of 150 min, $I(\delta_l; \delta_{rg})=0.106$, $I(\delta_{rg}; \delta_{by})=0.126$, and $I(\delta_l; \delta_{by})=0.100$.

Determining Vision Probability Functions

Vision probability functions 114 can be obtained by statistical analysis of the pixel difference information 108.

Figure 3A:
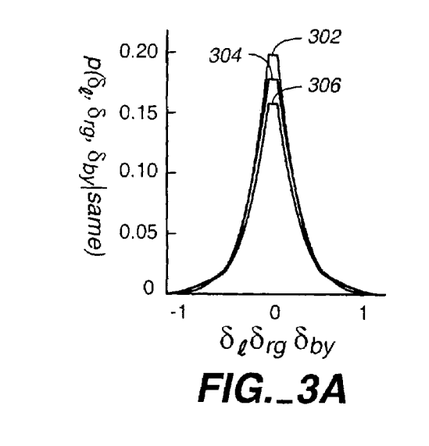
FIG. 3A shows pdf's for luminance and chromaticity between two pixels separated by 3 min. of visual angle in an application of the embodiment shown in FIG. 1.
Figure 3B:
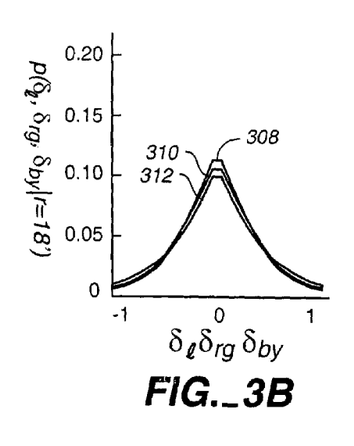
FIG. 3B shows pdf's for luminance and chromaticity between two pixels separated by 18 min. of visual angle in an application of the embodiment shown in FIG. 1.
Figure 3C:
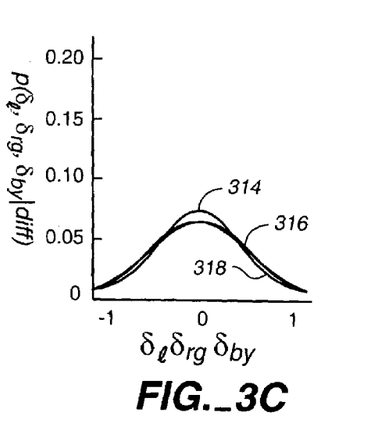
FIG. 3C shows pdf's for luminance and chromaticity between two pixels on difference images in an application of the embodiment shown in FIG. 1.

FIGS. 3A-3C show marginal pdf's (probability density functions) obtained by sampling from the images in the set. The curves in FIG. 3A show the marginal pdf's for differences in luminance 306 and color $\delta_{rg}$ 302, $\delta_{by}$ 304 between pixels separated by 3 min in an image. The curves in FIG. 3B show the marginal pdf's for differences in luminance $\delta_l$ 312 and color $\delta_{rg}$ 308, $\delta_{by}$ 310 between pixels separated by 18 min in an image. And finally, the curves in FIG. 3C show the marginal pdf's for differences in luminance $\delta_l$ 318 and color $\delta_{rg}$ 314, $\delta_{by}$ 316 between pixels in different images. The x axis in each graph represents $\delta_l$, $\delta_{rg}$, or $\delta_{by}$, and the y axis represents the corresponding probability.

Figure 3D:
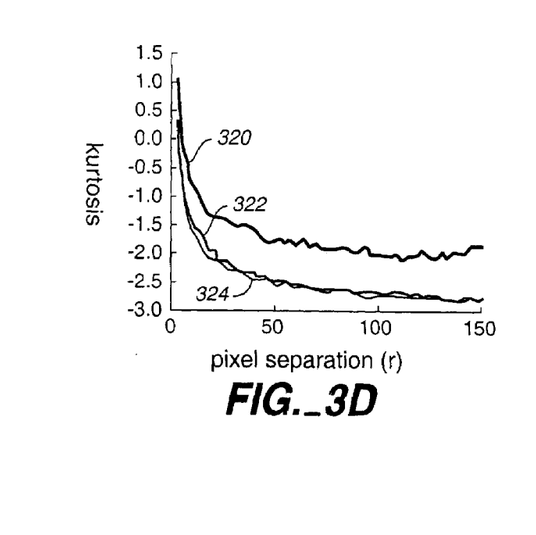
FIG. 3D shows kurtosis for pdf's for differences in luminance and color between pixels as a function of pixel separation in an application of the embodiment shown in FIG. 1.

In FIGS. 3A and 3B the curves are "peaky" or kurtotic, and centered on zero; that is, small differences in luminance or color are more common than they would be in a Gaussian distribution, which has a kurtosis of 0. The kurtoses of these pdf's are inversely related to the separation between the two pixels, as shown in FIG. 3D, which plots kurtosis as a function of pixel separation for $\delta_l$, 322, $\delta_{rg}$ 320, and $\delta_{by}$ 324. Approximately 0.5% of the tails of each distribution was excluded from the estimate of kurtosis, since these tails added a large amount of noise to the estimates, and the binning procedure used in the other analyses also limits the effect of these extreme outliers. The kurtosis is roughly similar for $\delta_l$, $\delta_{rg}$, and $\delta_{by}$, with the exception that the $\delta_{rg}$ distribution retains some kurtosis for large separations, even in comparisons between pixels from different images (FIG. 3C); this may be an artifact resulting from the limited gray-level resolution of the CCD camera, which affects the $\delta_{rg}$ distribution selectively owing to its smaller dispersion.

The distance-dependent kurtosis of FIG. 3C is not unexpected. When pairs of pixels are close to each other they are more likely to fall on the same surface; consequently, differences in luminance and color between them are likely to be small. When pairs of pixels fall on different surfaces, larger differences in both luminance and color are more likely. Suppose that any pair of sampled pixels falls into one of two categories: Either the two pixels belong to the same surface (same) or they belong to different surfaces (diff). To approximate a pdf for pixels belonging to the same surface, a pdf for adjacent pixels was used, which corresponds to a separation of ~3 arc min as shown in FIG. 3A:

$$p(\delta_l,\delta_{rg},\delta_{by}|\text{same}) \approx p(\delta_l,\delta_{rg},\delta_{by}|r=3'). \qquad (4)$$

To approximate the pdf for pixels belonging to different (diff) surfaces, the pdf for different images was used as shown in FIG. 3B:

$$p(\delta_l,\delta_{rg},\delta_{by}|\text{diff}) \approx p(\delta_l,\delta_{rg},\delta_{by}|\text{different-images}). \qquad (5)$$

These probabilities then allow a general representation for the pdf of vision difference information as a function of pixel separation in terms of the pdf's for same and different surfaces. In general, sampled pixel pairs are drawn from the population of pixel pairs belonging to the same surface with probability p(same|r), or from the population of pixel pairs belonging to different surfaces with probability 1−p(same|r), where p(same|r) depends on the spatial separation of the pixels. Using the given approximations, the pdf for pairs of pixels, for any given separation r, can be modeled as follows:

$$p(\delta_l, \delta_{rg}, \delta_{by} \mid r) = p(\text{same} \mid r) \cdot p(\delta_l, \delta_{rg}, \delta_{by} \mid \text{same}) + \quad (6)$$
$$\{1 - p(\text{same} \mid r)\} \cdot p(\delta_l, \delta_{rg}, \delta_{by} \mid \textit{diff}).$$

Equation (6) is then used to derive a best-fit value for p(same|r) for each pixel separation r by minimizing the RMS (Root Mean Square) differences, where Equations (5)-(6) are used in the right-hand side and the left-hand side is determined from the observed values (e.g., as in FIG. 3B). In FIG. 3B the best fit curve 326 for p(same|r) is shown.

As an alternative to the best-fit curve 326, an exponential curve 328 was also obtained by a similar fit. On the border between surfaces, adjacent pixels do not fall on the same surface. Therefore, the assumption (related to the best-fit curve 326) that adjacent pixels belong to the same surface is clearly somewhat inadequate. This approximation to the probability p(same|r) is given by $$p(\text{same} \mid r) = \exp(-r/r_0), \quad (7)$$

where the constant $r_0$ is given by $r_0 = 19.5$ arc min.

One advantage of using this simple equation (as compared with, for instance a power function, which could have a form invariant with viewing distance) is that as r approaches 0, p(same|r) approaches 1, as it should, since pixels infinitely close to each other belong to the same surface. Additionally, as r approaches infinity, p(same|r) approaches 0. As a verification of the characterization given by equation (7), calculations with equation (6) were compared with those obtained using equation (7), and minimal differences were found.

Figure 3E:
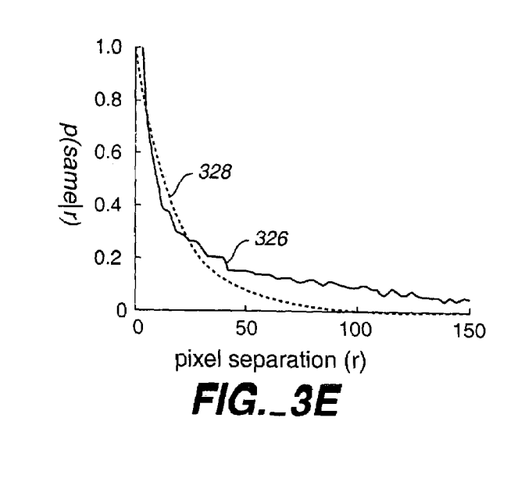
FIG. 3E shows estimates of p(same|r) as a function of pixel separation in an application of the embodiment shown in FIG. 1.

The above discussion illustrates a determination of the vision probability functions 114 for the embodiment shown in FIG. 1. Thus, the probability function p(same|r) 116 is determined as in equation (7) and FIG. 3E, the probability function $p(\delta_l, \delta_{rg}, \delta_{by} \mid \text{same})$ 118 is determined as in equation (4) and FIG. 3A, and the probability function $p(\delta_l, \delta_{rg}, \delta_{by}, r)$ 118 is determined from the observed values as in FIG. 3A.

Figure 4:
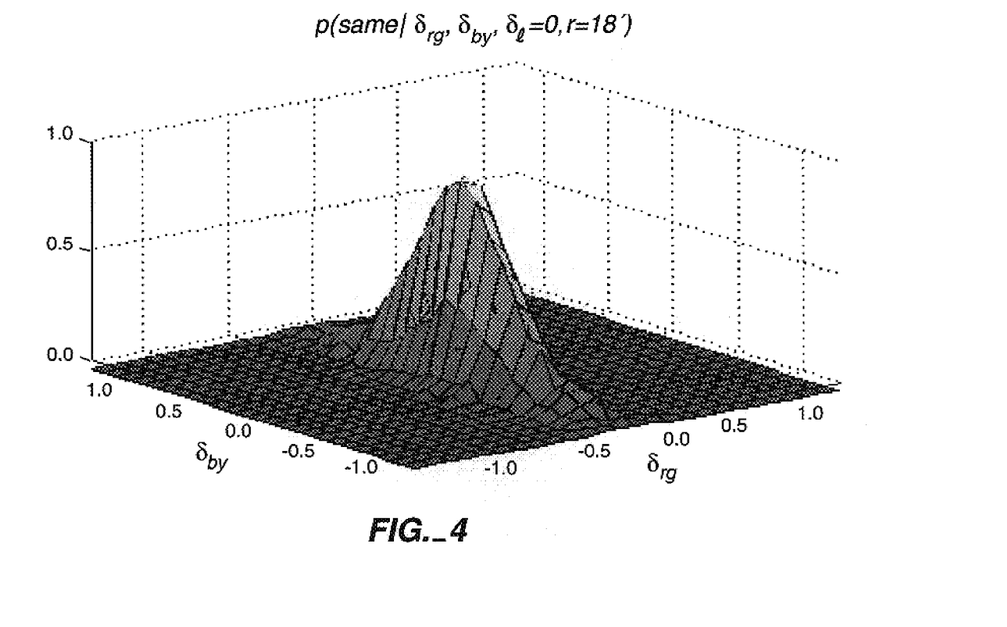
FIG. 4 shows a probability that two pixels separated by 18 min. belong to the same surface as a function of the differences in red-green and blue-yellow chromaticity between the pixels in an application of the embodiment shown in FIG. 1.

These values correspondingly determines the segmentation function $p(\text{same} \mid \delta_l, \delta_{rg}, \delta_{by}, r)$ 122 as in equation (1). Then for any pixel separation (e.g., for a nominal range between 3 and 150 min) one can determine a three-dimensional probability cube for the vision difference information 112. For example, FIG. 4 shows a slice through the cube obtained for r=18 min in the plane $\delta_l$=0. The ordinate is the probability equation (1) that two pixels 18 min apart belong to the same surface, given the difference in luminance and color between them.

TEST EXAMPLES

One common difficulty with using Bayesian models to predict human behavior is that estimating observers' priors often requires ad hoc assumptions or choosing those priors that best predict observers' performance. In both cases there is an issue of circularity, where it has to be assumed (rather unrealistically) that the human visual system has some sort of innate access to these priors. In the case of this embodiment, $p(\delta_l, \delta_{rg}, \delta_b \mid \text{same})$ and p(same|r) are based on the statistics of the natural environment, without any need for ad hoc assumptions. The embodiment of FIG. 1 thus provides a suitable test case for determining whether human performance matches that predicted by Bayesian statistics.

Segmentations by two Observers $O_1$ an $O_2$ were compared with the embodiment described above. Observers were presented with 36 image patches (3 patches from each of the 12 images) subtending 105×105 min (corresponding to 35×35 pixels). These patches were randomly chosen from the natural image set used to fix the model parameters. The choice of patches was constrained to be non-overlapping and not to extend over the boundary of the image. Image patches were then converted from cone space to red-green-blue space on a calibrated monitor. Observers performed the segmentations on image patches scaled to subtend 10.2 deg of visual angle while referring to a smaller, correctly scaled image patch (the full image was not available to the observer). In addition, both the model and observers were presented with 18 image patches from 6 uncalibrated digital photographs of man-made environments.

The central pixel of each image patch acted as a reference pixel. Observers categorized every other pixel in the image patch as "very unlikely to belong to the same surface as the reference pixel," "somewhat likely," "likely," or "very likely." Observers were given instructions to consider pixels as falling on the same surface if they appeared to belong to the same type of "stuff," regardless of whether they were in spatial contiguous regions within the image patch. Each pixel was given a p(same) value of 0, 0.33, 0.67 or 1 depending on how it had been categorized. This process was repeated four times, with a randomized order of patch presentation. The mean of the four segmentations was considered to be a measure of p(same) for each observer.

Figure 5A:
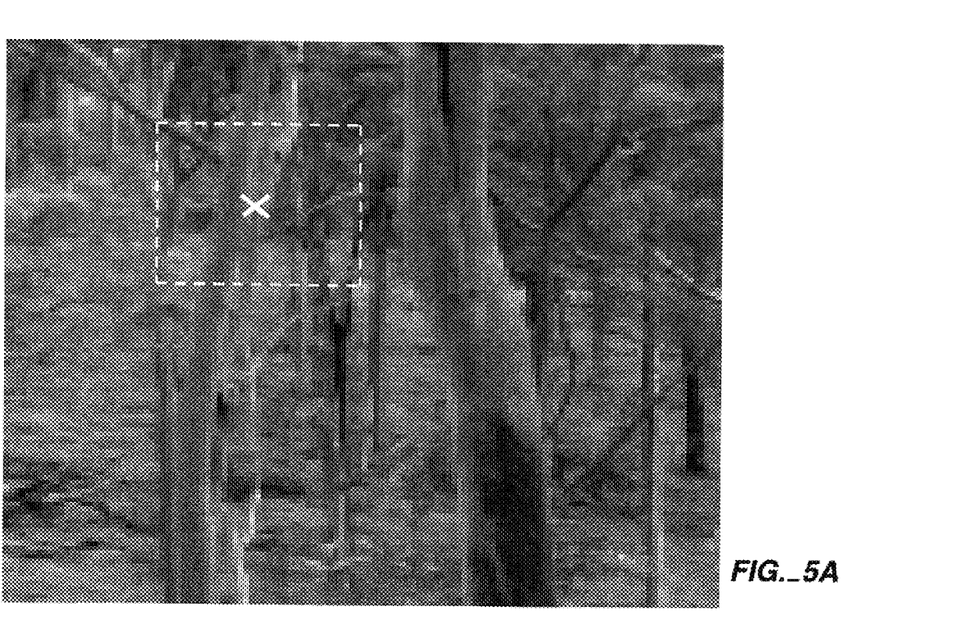
FIG. 5A shows a natural scene with an outlined image patch in an application of the embodiment shown in FIG. 1.
Figure 5B:
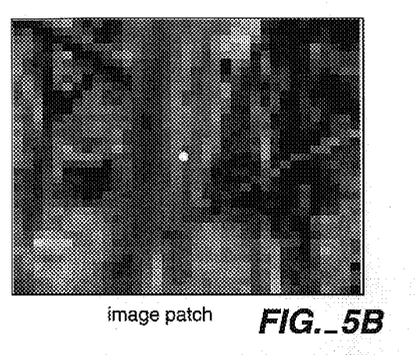
FIG. 5B shows a further detail of the image patch that is outlined in FIG. 5A.
Figure 5C:
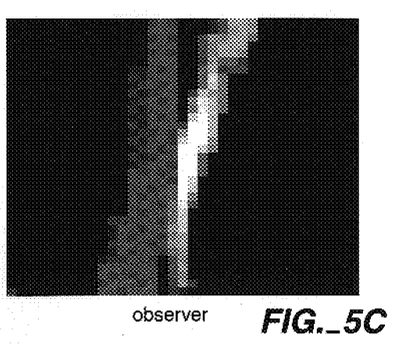
FIG. 5C shows mean estimates from a single observer of the likelihood that each pixel belongs to the same surface as the central pixel in FIG. 5B.
Figure 5D:
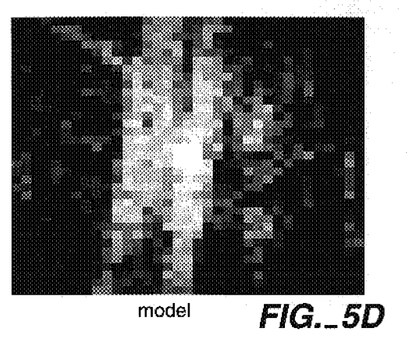
FIG. 5D shows estimates according to the embodiment shown in FIG. 1 that each pixel belongs to the same surface as the central pixel in FIG. 5B.
Figure 5E:
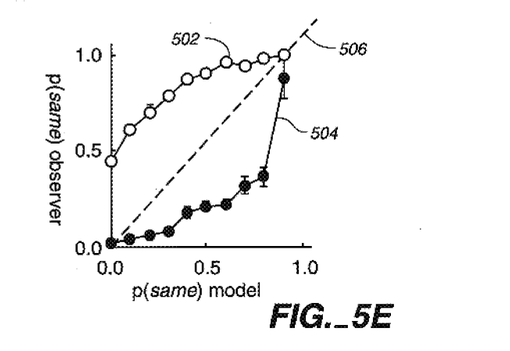
FIG. 5E shows comparisons of estimates of p(same) made by two observers for the image in FIG. 5A with estimates made according to the embodiment shown in FIG. 1.

FIG. 5A shows a characteristic natural scene from the set of twelve used to construct the models described above. An image patch is shown with a dotted outline. FIG. 5B shows the image patch from FIG. 5A in detail. FIG. 5C shows p(same) for one of the observers using gray scale, with lighter pixels representing larger values. FIG. 5D shows p(same) as estimated by the embodiment of FIG. 1 for the same patch. FIG. 5E shows a comparison between estimates of p(same) made by both observers to model estimates of p(same). For each image pixels were divided into ten bins based on model estimates of p(same). There were different numbers of pixels in each bin, and observer estimates of p(same) were averaged for all the pixels in each bin. These ten points are shown on curves for the first observer $O_1$ 502 and the second observer $O_2$ 504. Notably, as the model's estimate of p(same) increases, so do observers' estimates of p(same). A reference line 506 is shown at 45 degrees from each axis to show the performance associated with perfect agreement between observers and the model.

Depending on the degree of structure in the images, one can expect a corresponding degree of correlation between observer and model. For natural images, across all pixels, the correlation coefficient between estimates of p(same) made by observer $O_1$ and the model was 0.42, and the correlation coefficient between estimates of p(same) made by observer $O_2$ and the model was 0.51. In comparison, the correlation coefficient between estimates of p(same) made by observers $O_1$ and $O_2$ was 0.50. Variation between the two observers was as great as variation between the model and each observer for the natural images.

Figure 6A:
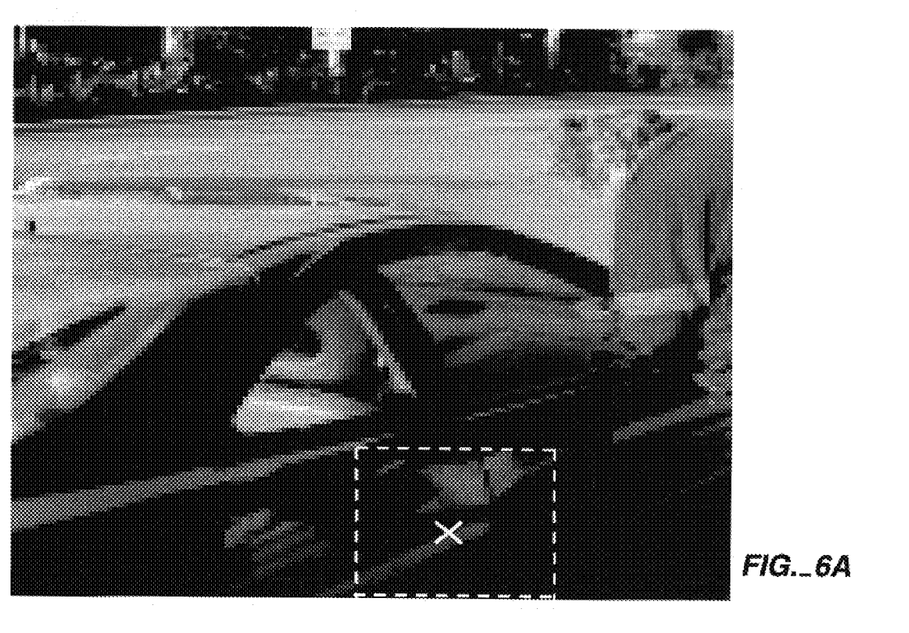
FIG. 6A shows a man-made scene with an outlined image patch in an application of the embodiment shown in FIG. 1.
Figure 6B:
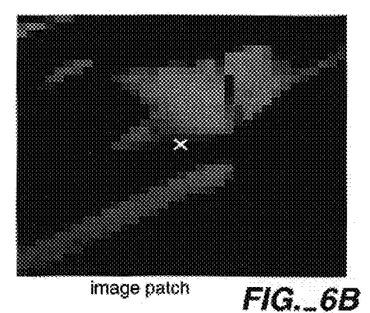
FIG. 6B shows a further detail of the image patch that is outlined in FIG. 6A.
Figure 6C:
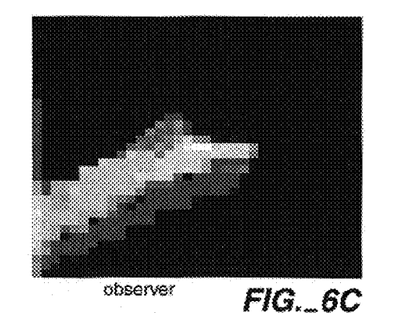
FIG. 6C shows mean estimates from a single observer of the likelihood that each pixel belongs to the same surface as the central pixel in FIG. 6B.
Figure 6D:
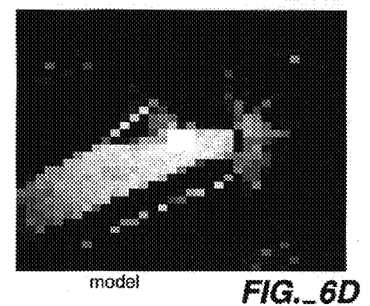
FIG. 6D shows estimates according to the embodiment shown in FIG. 1 that each pixel belongs to the same surface as the central pixel in FIG. 6B.
Figure 6E:
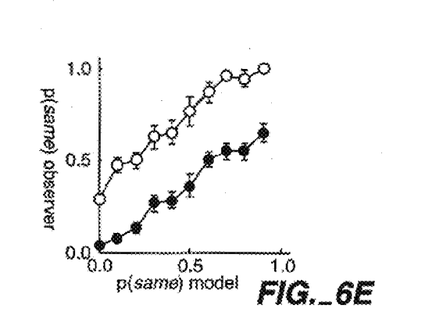
FIG. 6E shows comparisons of estimates of p(same) made by two observers for the image in FIG. 6A with estimates made according to the embodiment shown in FIG. 1.

Analogously to the FIG. 5A, FIG. 6A shows a characteristic man-made scene from the six images used from man-made environments. An image patch is shown with a dotted outline. FIG. 6B shows the image patch from FIG. 6A in detail. FIG. 6C shows p(same) for one of the observers using gray scale, with lighter pixels representing larger values. FIG. 6D shows p(same) as estimated by the embodiment of FIG. 1 for the same patch. FIG. 6E shows a comparison between estimates of p(same) made by both observers to model estimates of p(same) where the pixels were similarly divided into ten bins based on model estimates of p(same). These ten points are shown on curves for the first observer $O_1$ 602 and the second observer $O_2$ 604. As in the above natural-image example, a reference line 606 is shown at 45 degrees from each axis to show the performance associated with perfect agreement between observers and the model.

For the man-made scenes, correlation between the model and observers was slightly higher for the novel man-made scenes: 0.54 between the model and observer $O_1$ and 0.66 between the model and observer $O_2$. Correlation between the two observers was 0.75, higher than for the natural scenes and higher than the correlation between the model and observers. This is probably because the made-made scenes contained a large amount of contour information not available to the model.

Figure 7A:
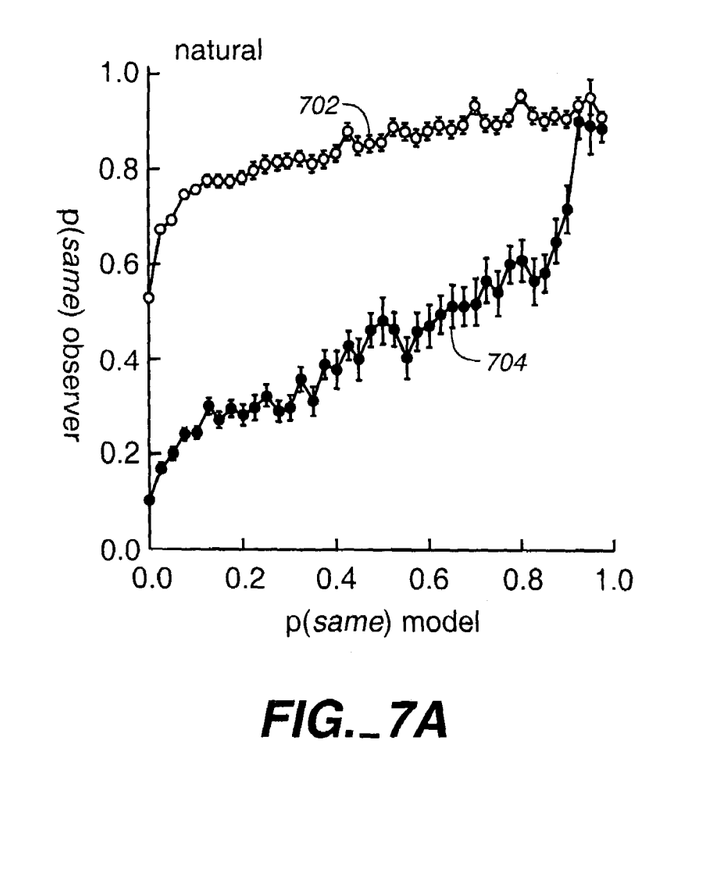
FIG. 7A shows for natural scenes a comparison of estimates of p(same) made by observers with estimates made according to the embodiment shown in FIG. 1.
Figure 7B:
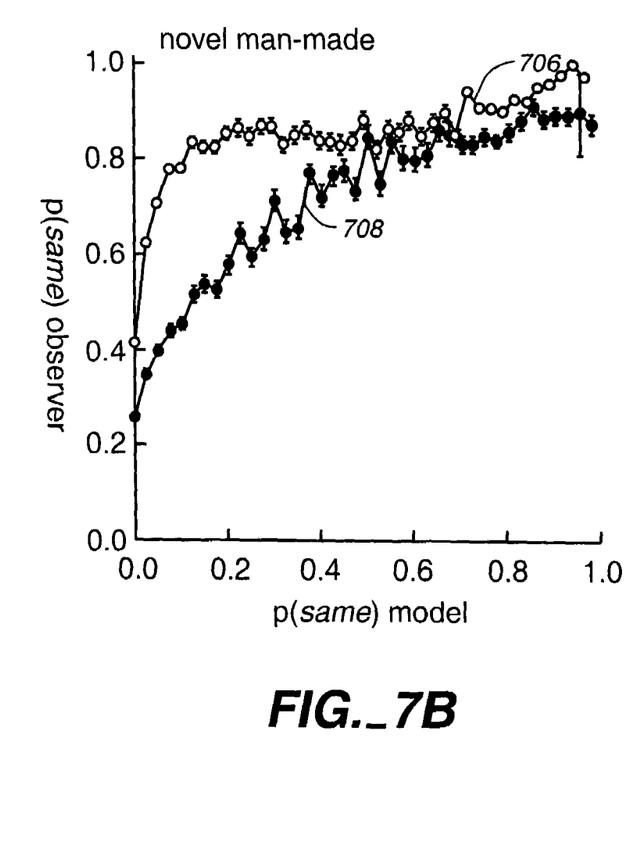
FIG. 7B shows for man-made scenes a comparison of estimates of p(same) made by observers with estimates made according to the embodiment shown in FIG. 1.

To summarize the test cases, FIGS. 7A and 7B respectively compare estimates of p(same) made by both observers to model estimates of p(same) averaged across all natural images patches and across all 18 novel scenes. FIG. 7A shows curves for observer $O_1$ 702 and $O_2$ 704, and FIG. 7B shows curves for observer $O_1$ 706 and $O_2$ 708. (Error bars subtend plus and minus one standard error.) Because there were a large number of pixels, the pixels were divided into 40 bins based on model estimates of p(same). (There were again different numbers of pixels in each bin.) The observer estimates of p(same) for all the pixels in each bin were then averaged. These 40 points are shown in FIGS. 7A and 7B. As the model's estimate of p(same) increases, so do observers' estimates of p(same), although one observer's probabilities always exceed those of the model.

ADDITIONAL EMBODIMENTS

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, more specific embodiments of the present invention can be directed towards applications such as tissue identification in medical devices and target identification in satellite images. Additional embodiments can be directed towards image enhancement in low-vision devices. For example, segmentation of surfaces can be followed by enhancement (e.g., pixel-level adjustment) across surfaces, or alternatively segmentation and enhancement can be coupled in a more complex way.

Although the embodiment of FIG. 1 employs three entities ($\delta_l$, $\delta_{rg}$, $\delta_{by}$) for the vision difference information 112, alternative embodiments with other vision difference characterizations are also possible. For the vision data from twelve images as discussed above, using a single entity related to luminance ($\delta_l$) for the vision difference information 112 leads to qualitatively similar curves in FIGS. 3A-3C.

What is claimed is:

1. A method for determining if a first pixel and a second pixel belong to a same surface, the method comprising:
   determining a spatial-difference value for the first pixel and the second pixel, wherein determining the spatial-difference value includes measuring degrees of visual angle between the first pixel and the second pixel;
   determining one or more vision-difference values for the first pixel and the second pixel;
   determining, from the spatial-difference value, an initial same-surface probability value for if the first pixel and the second pixel belong to the same surface;
   determining, from the one or more vision-difference values, a first vision-difference probability value for if the first pixel and the second pixel belong to the same surface;
   determining, from the spatial-difference value and the one or more vision-difference values, a second vision-difference probability value;
   determining, from the initial same-surface probability value, the first vision-difference probability value and the second vision-difference probability value, an improved same-surface probability value for if the first pixel and the second pixel belong to the same surface.

2. A method according to claim 1, wherein determining the one or more vision-difference values includes:
   measuring vision data with a camera; and
   filtering the vision data to calculate the one or more vision-difference values.

3. A method according to claim 1, wherein determining the initial same-surface probability value includes: fitting a vision data set to an exponential model for pixel separation.

4. A method according to claim 1, wherein determining the first vision-difference probability value includes extracting from a vision data set values corresponding to pixels separated by a threshold value for spatial-differences.

5. A method according to claim 1, wherein determining the second vision-difference probability value includes extracting from a vision data set values corresponding to pixels separated by the spatial-difference value.

6. A method according to claim 1, wherein determining the improved same-surface probability value includes arithmetically combining the initial same-surface probability value, the first vision-difference probability value, and the second vision-difference probability value.

7. A method according to claim 1, wherein the one or more vision-difference values include a luminance difference value, a red green difference value and a blue-yellow difference value.

8. A method for determining if a first pixel and a second pixel belong to a same surface, the method comprising:
   determining a spatial-difference value for the first pixel and the second pixel, wherein determining the spatial-difference value includes measuring degrees of visual angle between the first pixel and the second pixel;
   determining one or more vision-difference values for the first pixel and the second pixel;
   determining, from the spatial-difference value, an initial same-surface probability value for if the first pixel and the second pixel belong to the same surface;
   determining, from the spatial-difference value and the one or more vision-difference values, a probability scaling value; and
   determining, from the initial same-surface probability value and the probability-scaling value, an improved same-surface probability value for if the first pixel and the second pixel belong to the same surface.

9. A method according to claim 8, wherein determining the one or more vision-difference values includes:
   measuring vision data with a camera; and
   filtering the vision data to calculate the one or more vision-difference values.

10. A method according to claim 8, wherein determining the initial same-surface probability value includes: fitting a vision data set to an exponential model for pixel separation.

11. A method according to claim 8, wherein determining the probability-scaling value includes determining, from the one or more vision-difference values, a first vision-difference probability value for if the first pixel and the second pixel belong to the same surface;

determining, from the spatial-difference value and the one or more vision-difference values, a second vision-difference probability value; and calculating the probability scaling value by arithmetically combining the first vision-difference probability value and the second vision-difference probability value.

12. A method according to claim 11, wherein determining the first vision-difference probability value includes extracting, from a vision data set, values corresponding to pixels separated by a threshold value for spatial differences, and determining the second vision-difference probability value includes extracting, from the vision data set, values corresponding to pixels separated by the spatial-difference value.

13. A method according to claim 8, wherein determining the improved same-surface probability value includes arithmetically combining the initial same-surface probability value and the probability scaling value.

14. A method according to claim 8, wherein the one or more vision-difference values include a luminance difference value, a red-green difference value and a blue-yellow difference value.

15. An apparatus for determining if a first pixel and a second pixel belong to a same surface, the apparatus comprising executable instructions for:

determining a spatial-difference value for the first pixel and the second pixel, wherein determining the spatial-difference value includes measuring degrees of visual angle between the first pixel and the second pixel;

determining one or more vision-difference values for the first pixel and the second pixel;

determining, from the spatial-difference value, an initial same-surface probability value for if the first pixel and the second pixel belong to the same surface;

determining, from the one or more vision-difference values, a first vision-difference probability value for if the first pixel and the second pixel belong to the same surface;

determining, from the spatial-difference value and the one or more vision-difference values, a second vision-difference probability value;

determining, from the initial same-surface probability value, the first vision-difference probability value and the second vision-difference probability value, an improved Same-surface probability value for if the first pixel and the second pixel belong to the same surface.

16. An apparatus according to claim 15, wherein determining the one or more vision-difference values includes:

measuring vision data with a camera; and filtering the vision data to calculate the one or more vision-difference values.

17. An apparatus according to claim 15, wherein determining the initial same-surface probability value includes: fitting a vision data set to an exponential model for pixel separation.

18. An apparatus according to claim 15, wherein determining the first vision-difference probability value includes extracting from a vision data set values corresponding to pixels separated by a threshold value for spatial-differences.

19. An apparatus according to claim 15, wherein determining the second vision-difference probability value includes extracting from a vision data set values corresponding to pixels separated by the spatial-difference value.

20. An apparatus according to claim 15, wherein determining the improved same-surface probability value includes arithmetically combining the initial same-surface probability value, the first vision-difference probability value, and the second vision-difference probability value.

21. An apparatus according to claim 15, wherein the one or more vision-difference values include a luminance difference value, a red-green difference value and a blue-yellow difference value.

22. An apparatus for determining if a first pixel and a second pixel belong to a same surface, the apparatus comprising executable instructions for:

determining a spatial-difference value for the first pixel and the second pixel, wherein determining the spatial-difference value includes measuring degrees of visual angle between the first pixel and the second pixel;

determining one or more vision-difference values for the first pixel and the second pixel;

determining, from the spatial-difference value, an initial same-surface probability value for if the first pixel and the second pixel belong to the same surface;

determining, from the spatial-difference value and the one or more vision-difference values, a probability scaling value; and determining, from the initial same-surface probability value and the probability-scaling value, an improved same-surface probability value for if the first pixel and the second pixel belong to the same surface.

23. An apparatus according to claim 22, wherein determining the one or more vision-difference values includes:

measuring vision data with a camera; and filtering the vision data to calculate the one or more vision-difference values.

24. An apparatus according to claim 22, wherein determining the initial same-surface probability value includes: fitting a vision data set to an exponential model for pixel separation.

25. An apparatus according to claim 22, wherein determining the probability-scaling value includes determining, from the one or more vision-difference values, a first vision-difference probability value for if the first pixel and the second pixel belong to the same surface;

determining, from the spatial-difference value and the one or more vision-difference values, a second vision-difference probability value; and calculating the probability scaling value by arithmetically combining the first vision-difference probability value and the second vision-difference probability value.

26. An apparatus according to claim 25, wherein determining the first vision-difference probability value includes extracting, from a vision data set, values corresponding to pixels separated by a threshold value for spatial differences, and determining the second vision-difference probability value includes extracting, from the vision data set, values corresponding to pixels separated by the spatial-difference value.

27. A method according to claim 22, wherein determining the improved same-surface probability value includes arithmetically combining the initial same-surface probability value and the probability scaling value.

28. A method according to claim 22, wherein the one or more vision-difference values include a luminance difference value, a red-green difference value and a blue-yellow difference value.

* * * * *